United States Patent [19]
Kawamoto

[11] Patent Number: 6,057,940
[45] Date of Patent: May 2, 2000

[54] IMAGE PROCESSING APPARATUS

[75] Inventor: Hiroyuki Kawamoto, Kanagawa, Japan

[73] Assignee: Ricoh Company, Ltd., Tokyo, Japan

[21] Appl. No.: 09/046,714

[22] Filed: Mar. 24, 1998

[30] Foreign Application Priority Data

Mar. 24, 1997 [JP] Japan .................................... 9-087226

[51] Int. Cl.⁷ .................................................. H04N 1/00
[52] U.S. Cl. ........................... 358/404; 358/444; 358/468
[58] Field of Search .................................... 358/404, 444, 358/437, 403, 434, 468

[56] References Cited

U.S. PATENT DOCUMENTS

| | | | |
|---|---|---|---|
| 5,315,403 | 5/1994 | Hirai et al. | 358/404 |
| 5,335,085 | 8/1994 | Nakatsuma | 358/404 |
| 5,537,218 | 7/1996 | Negi | 358/404 |
| 5,666,211 | 9/1997 | Tahara et al. | 358/404 |
| 5,710,843 | 1/1998 | Tsukamoto et al. | 382/305 |

*Primary Examiner*—Kimberly A. Williams
*Assistant Examiner*—Derrick Fields
*Attorney, Agent, or Firm*—Oblon, Spivak, McClelland, Maier & Neustadt, P.C.

[57] ABSTRACT

A novel image processing apparatus having a scanner for scanning an image data on a manuscript, an image processor for processing the image data, a memory for storing the processed image data, a hard disk for recording the data stored in the memory, a printer for printing the image stored in the memory, a data transmission unit for transmitting the data stored in the memory to another image processing apparatus, and a control unit for storing the data recorded on the hard disk. When the transmission of the image data to another image processing apparatus is stopped due to an error, the image data stored on the hard disk is read into the memory. Thus, the user is not required to re-scan the image data on the manuscript in the event of a transmission error.

8 Claims, 5 Drawing Sheets

IMAGE PROCESSING APPARATUS

BACKGROUND OF THE INVENTION

1. Field of the Invention

This invention relates to a image processing apparatus having a data transmission device that communicates with another image processing apparatus, and more particularly to an image processing apparatus that can recover data in the event of a transmission error.

2. Discussion of the Background

Some image processing apparatuses, such as digital copiers, have a data transmission device that communicates with a second image processing apparatus. With these image processing apparatuses, data transmission begins after a manuscript is set in a scanning unit (e.g., a scanner or contact glass) and an image on the manuscript is scanned. If the transmission is stopped by an error, the user of a conventional image processing apparatus has to re-scan the image on the manuscript by re-setting the manuscript in the scanning unit.

SUMMARY OF THE INVENTION

In view of the foregoing, it is an object of this invention to provide a novel image processing apparatus which recovers image data when a transmission error occurs. Thus, a user does not have to re-scan the image on a manuscript by re-setting the manuscript in a scanning unit every time transmission is stopped by an error.

In accordance with the present invention there is provided an image processing apparatus that includes a scanner for scanning an image on a manuscript to generate image data, an image processor for processing the image data, a memory for storing the processed image data, a hard disk for recording the data stored in the memory, a printer for printing out the image data stored in the memory, and a data transmission device for transmitting the data stored in the memory to another image processing apparatus. When data transmission to the other image processing apparatus is stopped by an error, the data recorded on the hard disk is rewritten into the memory to recover the image data.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
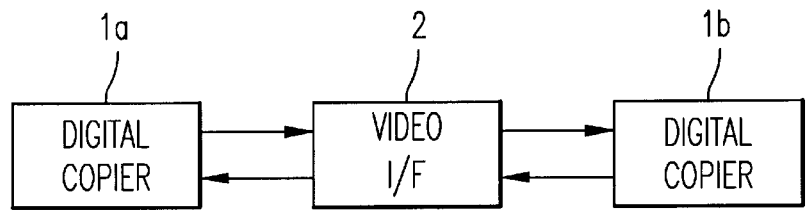
FIG. 1 is a schematic diagram of the overall layout of the present invention.

Referring now to the drawings, wherein like reference numerals designate identical or corresponding parts throughout the several views, and more particularly to FIG. 1, thereof, a digital copier 1a communicates with another digital copier 1b through a video interface 2.

Figure 2:
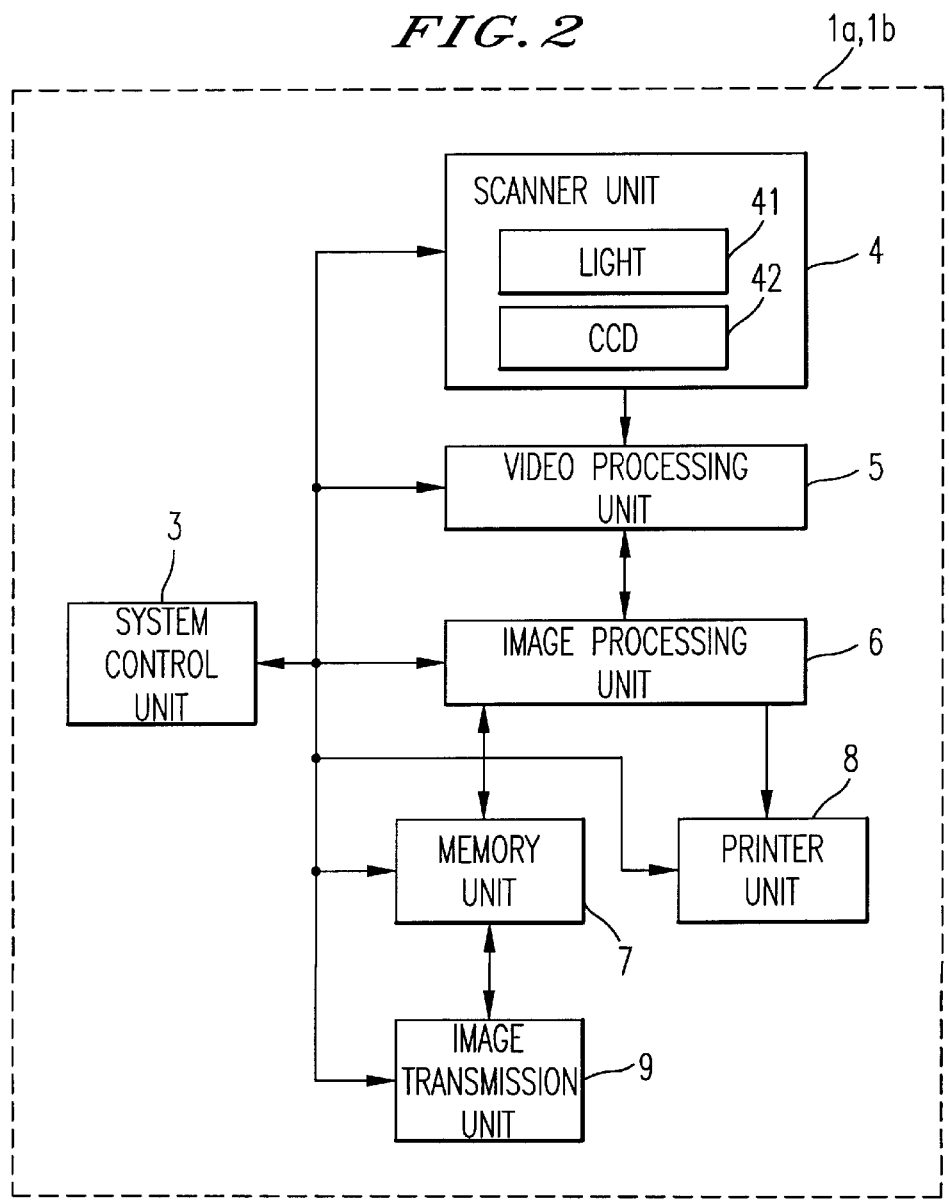
FIG. 2 is a schematic diagram of one of the digital copiers shown in FIG. 1.

As shown in FIG. 2, both digital copiers 1a and 1b have a system control unit 3 that controls a scanner unit 4, a video processing unit 5, an image processing unit 6, a memory unit 7, a printer unit 8, and an image transmission unit 9 that sends and receives image data to and from the video interface 2.

The scanner unit 4 has a light portion 41 and a charge coupled device (CCD) 42 for scanning an image on a manuscript to produce image data. The video processing unit 5 reads the image data from the CCD 42 by reading the timing signal CCDSTN (FIG. 3) of the image processing unit 6, amplifies the image data, converts the image data from analog form to digital form, and outputs the image data as 8 bit digital image data DATA (7:0) (FIG. 3) with same period as a 20MHz clock signal CK1 (FIG. 3) of the image processing unit 6.

Figure 3:
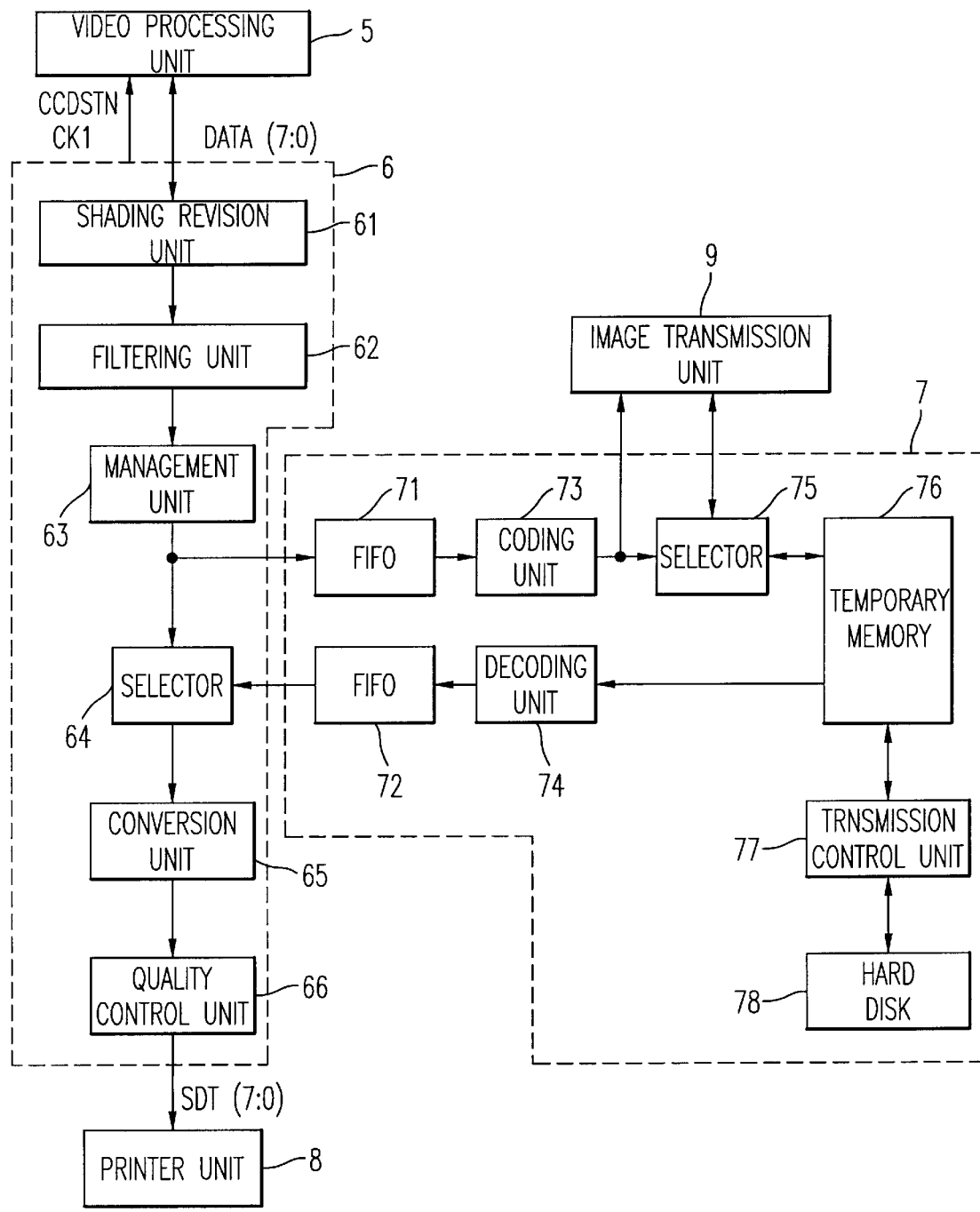
FIG. 3 is a schematic diagram of an image processing unit and a memory unit of the digital copier of FIG. 2.

As shown in FIG. 3, a shading revision unit 61, a filtering unit 62, and a odd times management unit 63 of the image processing unit 6 process the image data to generate processed image data. The processed image data is sent from the image processing unit 61 to the memory unit 7.

In the memory unit 7, the processed image data is sent through a 4 line FIFO 71, a coding unit 73, an image transmission unit 9, a selector 75, a temporary memory 76, and transmission control unit 77 before being recorded in a hard disk 78.

The memory unit 7 outputs the processed image data recorded in the hard disk 78 to image transmission unit 9 through the selector 75. The image transmission unit 9 transmits the processed image data to another digital copier thorough the video interface 2.

Image data received by the image transmission unit 9 from the other digital copier is sent through though a decoding unit 74, a 4 line FIFO 72, a selector 64, a gamma conversion unit 65, and a quality control unit 66 before being output to the printer unit 8. The printer unit prints the image data received by the other copier and prints the image on paper.

Figure 4:
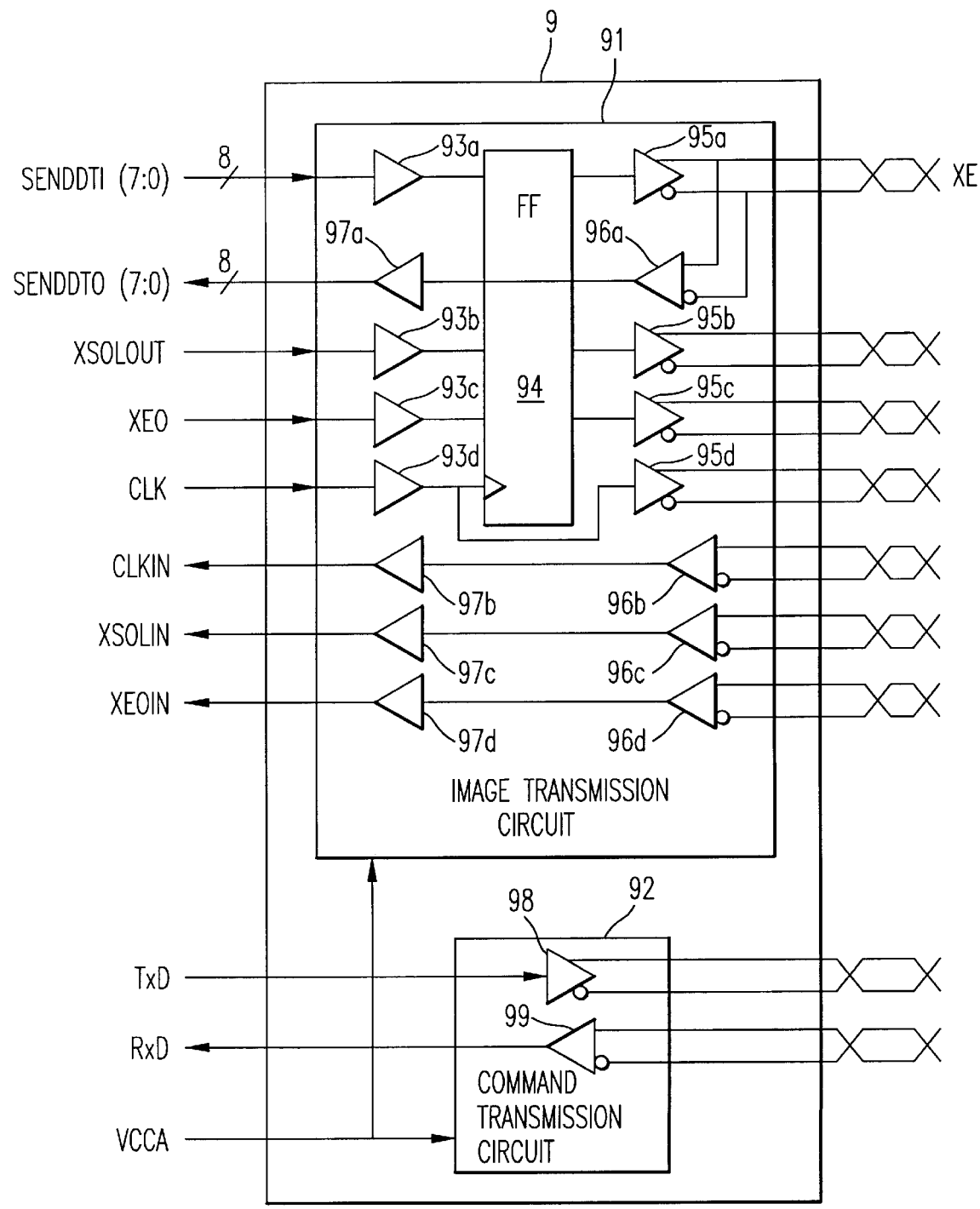
FIG. 4 is a schematic diagram of the image transmission unit used in the digital copier of FIG. 2.

FIG. 4 is a schematic diagram of the image transmission unit 9 which includes an image transmission circuit 91 and a command transmission circuit 92.

Figure 5:
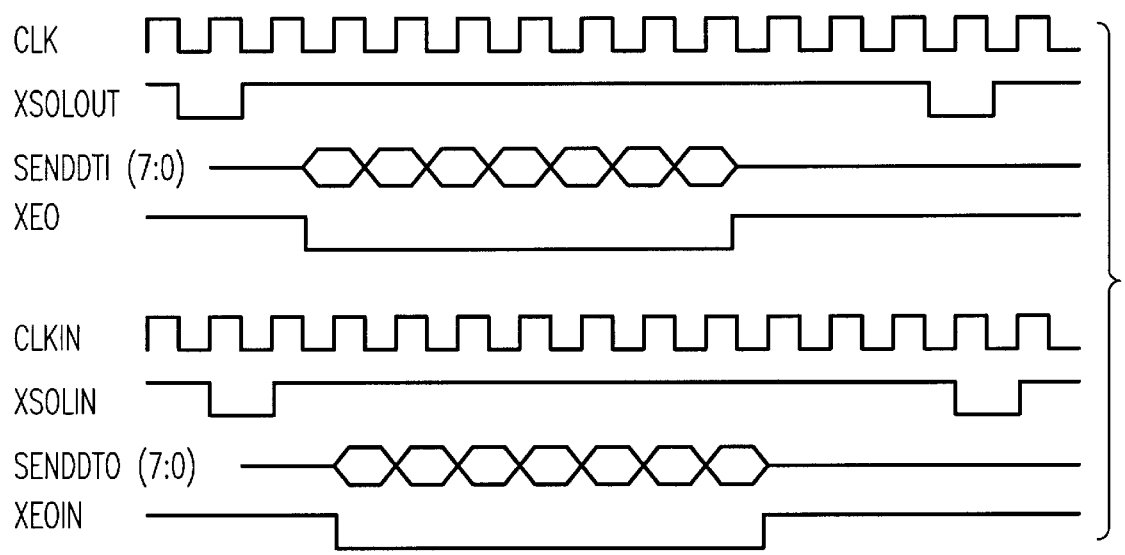
FIG. 5 is a wave chart showing the relative timing of the signals in the image transmission unit of FIG. 4.

The output data output from the image transmission circuit 91 has a reference clock, clk, compressed image data, Senddti (7:0), having the same period as the reference clock, top data of the image data, xsolout, and a range of the image data, xeo. The input data input from the image transmission circuit 91 has a reference clock, clkin, compressed image data, Senddti (7:0), having the same period as the reference clock, top data of the image data, xsolin, and the range of the image data, xeoin. These wave forms are shown in FIG. 5.

Referring back to FIG. 4, the image transmission unit 9 outputs the compressed image data, Senddti (7:0), with same period as the reference clock, the top data of the image data, xsolout, the range of the image data, xeo, and the reference clock, clk, to buffers 93a through 93d, respectively. The flip-flop 94 receives the respective data from buffers 93a through 93d and transmits the data to the other copier by differential drivers 95a through 95d (e.g., RS422 drivers). The image transmission unit 9 receives input data from the other digital copier in differential receivers 96a through 96d, and sends the input data to the memory unit 7 via buffers 97a through 97d.

Figure 6:
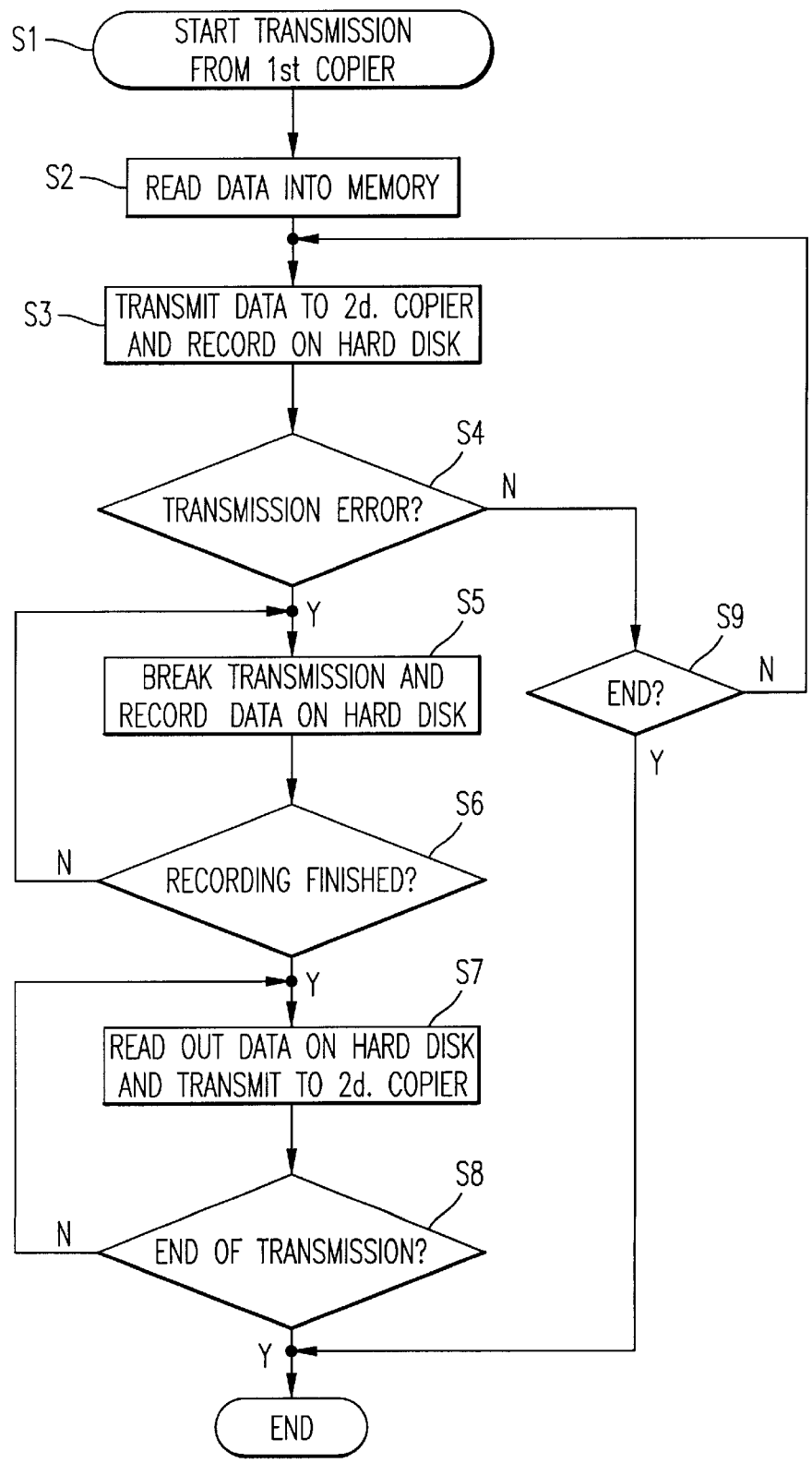
FIG. 6 is a flow chart for a method of recovering image data according to the present invention when the transmission of data is stopped by an error.

FIG. 6 is a flow chart of a method for recovering image data in accordance with the present invention when a transmission is stopped by an error.

In step S1 a first digital copier 1i areceives a command to begin the transmission of image data. Then, in step S2, the image data is read into the temporary memory 76. Next, in step S3 the image data is transmitted to a second digital copier and recorded onto the hard disk 78 of the first digital copier. In step S4, it is determined whether or not a transmission error has occurred. If a transmission error has not occurred, the process proceeds to step S9. In step S9 it is determined whether the transmission has ended. If the transmission has ended, then the process has ended without error. If the transmission has not ended, then the process proceeds to step S3 and the transmission of data to the second digital copier continues.

In step S4, if a transmission error has occurred, then the process proceeds to step S5. In step S5 the transmission is broken and data is recorded to the hard disk 78. Next, in step S6 it is determined whether the recording of image data into the hard disk has finished. If the recording has not finished, then the process proceeds to step S5 and the recording of data onto the hard disk 78 continues. If the recording of the image data onto the hard disk 78 has finished, then the process proceeds to step S7. In step S7, the image data is read out of the hard disk 78 and transmitted to the second digital copier. Next, in step S8, it is determined whether the transmission of image data to the second digital copier has ended. If the transmission of the image data to the second digital copier has ended, then the process ends. If the transmission of the image data to the second digital copier has not ended, then the transmission of the image data to the second digital copier continues.

Therefore, re-scanning is not necessary. Once a manuscript has been set in a scanning unit and scanned, if the transmission is stopped by an error, the processed image data is not lost, and the user need not re-scan the image of the manuscript by re-setting the manuscript in the scanning unit.

This application is based on Japanese Patent Application No. 09-087226, filed Mar. 24, 1997, the entire disclosure of which is incorporated by reference herein.

What is claimed is:

1. An image processing apparatus comprising:

a scanner for scanning an image on a manuscript to produce image data;

an image processor for processing the image data to produce processed image data;

a first memory that stores the processed image data;

a second memory that records the processed image data stored in the first memory;

a printer for printing out an image based on the image data stored in the first memory;

a data transmission device for transmitting the data stored in the first memory to another image processing apparatus; and a control unit configured to cause the data transmission device to cease the transmission of the processed image data stored in the first memory to the other image precessing device and to cause the second memory to continue recording the processed image information stored in the first memory, when a data transmission error occurs.

2. The apparatus of claim 1, wherein the second memory comprises a hard disk.

3. The apparatus of claim 1, wherein the control unit comprises:

means for causing the processed image data to be read out of the second memory and transmitted to the other image processing apparatus when the recordation of the image processing data in the second memory is complete.

4. An image processing apparatus comprising:

means for scanning an image on a manuscript to produce image data;

means for processing the scanned image data to produce processed image data;

memory means for storing the processed image data in a first memory;

recording means for recording the processed image data stored in the first memory on a second memory;

means for printing out an image based on the processed image data stored in the memory means;

data transmission means for transmitting the processed image data stored in the memory means to another image processing apparatus; and control means for causing the data transmission device to cease the transmission of the processed image data stored in the first memory to the other image processing device and for causing the second memory to continue recording the processed image information stored in the first memory, when a data transmission error occurs.

5. The apparatus of claim 4, wherein the recording means comprises a hard disk.

6. The apparatus of claim 4, wherein the control means comprises:

means for causing the processed image data to be read out of the second memory and transmitted to the other image processing apparatus when the recordation of the image processing data in the second memory is complete.

7. A method for transmitting an image from an image processing apparatus, said method comprising:

scanning an image data on a manuscript to produce scanned image data;

processing the scanned image data to produce processed image data;

storing the processed image data in a first memory;

recording on a second memory the processed image data stored in the first memory;

transmitting the processed image data stored in the memory to another image processing apparatus; and determining whether an error has occurred in the transmission of the processed image data; and breaking the transmission of the processed image data stored in the first memory to the other image processing device while continuing to record in the second memory the processed image data stored in the first memory, when an error occurs in the transmission of the processed image data.

8. The method of claim 7, further comprising:

reading the processed image data out of the second memory and transmitting the processed image data to the other image forming apparatus, when the recordation of the image processing data in the second memory is complete.

* * * * *